Patented May 31, 1932

1,861,323

UNITED STATES PATENT OFFICE

MAX SCHMID, OF RIEHEN, NEAR BASEL, SWITZERLAND, ASSIGNOR TO FIRM SOCIETY OF CHEMICAL INDUSTRY IN BASLE, OF BASEL, SWITZERLAND

STILBENE DYESTUFFS AND PROCESS OF MAKING SAME

No Drawing. Application filed March 12, 1930, Serial No. 435,354, and in Switzerland March 16, 1929.

The present invention relates to the manufacture of new dyestuffs. It comprises the process of making these dyestuffs, the dyestuffs themselves, and the material dyed with the new dyestuffs.

In U. S. Patent No. 903,284 cotton dyestuffs are described which are produced by condensing in an alkaline medium one molecule of a monoamino-azo-dyestuff with one molecule of p-p'-dinitrostilbene-o-o'-disulfonic acid, p-p'-dinitrodibenzyl-o-o'-disulfonic acid or a conversion product of the p-nitrotoluene-sulfonic acid.

The present invention is based on the discovery that new technically valuable products are made by condensing in a closed system, at 110 to 150° C., and in various stoichiometrical proportions, aromatic aminocompounds with dinitrostilbenedisulfonic acid, dinitrodibenzyldisulfonic acid or a conversion product of para-nitrotoluenesulfonic acid of the general formula

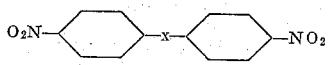

wherein at least one benzene nucleus contains a sulfo-group, and $x$ stands for a bridge consisting of two carbon atoms each of which is linked with one of the benzene nuclei.

The condensation can be effected with a single aromatic compound containing amino groups, or there can also be used mixtures as well as compounds containing two amino groups.

Amines which contain chromophoric groups, such as, for example, mono- or poly-azo-dyestuffs yield condensation products dyeing deeper tints.

If it is intended to produce condensation dyestuffs containing metal, the final products may be treated with agents yielding metal, or metalliferous amino-azo-dyestuffs may be used for the condensation.

The products obtained by the invention differ from the corresponding products made without application of pressure in that the tints which they produce are deeper in tone, of enhanced fastness to alkali and improved fastness to light. These improvements, which could not be foreseen, constitute an important technical advance in the manufacture of the so-called stilbene dyestuffs.

The following examples illustrate the invention, the parts being by weight:—

Example 1

An autoclave provided with a stirrer is charged with 33 parts of the saponified dyestuff from diazotized aniline-3-sulfonic acid and aniline-ω-methane-sulfonic acid of the formula

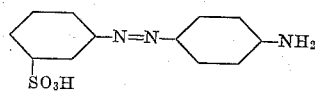

43 parts of sodium dinitrostilbenedisulfonate of the formula

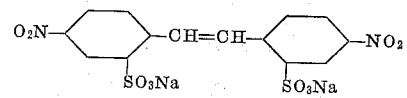

1000 parts of water and 250 parts of caustic soda solution of 36° Bé. The temperature is raised to 115–120° C. and condensation is continued for 6 hours at this temperature. After cooling, the caustic soda solution is neutralized by acid and the separation of the dyestuff is completed by salting out, whereupon the dyestuff is filtered.

The dried product is a red-brown powder soluble in water and dilute alkalies to a yellow-orange solution and in concentrated sulfuric acid to a pure blue solution; it dyes cotton orange tints fast to light and alkali.

The operation is similar with other azo-dyestuffs containing amino-groups, such as those which are made from diazo-components, such as aniline-4-sulfonic acid, ortho-toluidine-4-sulfonic acid, 2-chloro-1-aminobenzene-5-sulfonic acid, 4-chloro-1-aminobenzene-3-sulfonic acid, 1-amino-naphthalene-5-sulfonic acid, 1-aminonaphthalene-6-sulfonic acid, 2-aminonaphthalene-3:6-disulfonic acid, and from coupling components, such as aniline-ω-methane-sulfonic acid, ortho-toluidine-ω-methanesulfonic acid, para-xylidine, 1-methyl-3-amino-4-alkoxybenzene, α-naphthylamine or the like, or from azo-dyestuffs deriving from aromatic diamines or aminohydroxynaphthalene sulfonic acids or the N- derivatives thereof having external amino-groups, for example, products from diazotizing components, such as aniline and its homologues and substitution products and coupling compounds, such as meta-phenylenediamine, 2:8:6- or 2:5:7-aminonaphthol sulfonic acid, or the derivatives of Rosanthrene type, such as inter alia 2-(m'-amino-benzoyl-amino)-5-hydroxynaphthalene-7-sulfonic acid or the azimide of the formula

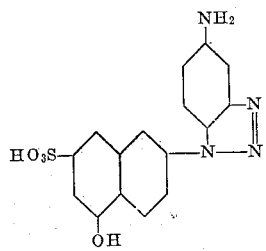

of German Patent No. 214,658, or if in place of sodium dinitrostilbenedisulfonic acid the salt of dinitrodibenzyldisulfonic acid of the formula

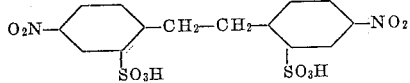

is used for the condensation.

Products are obtained which dye cotton yellow-orange to orange and brown-red tints.

*Example 2*

An autoclave having a stirrer is charged with 66 parts of the saponified dyestuff from diazotized aniline-3-sulfonic acid and aniline-ω-methanesulfonic acid, 43 parts of sodium dinitrostilbenedisulfonate, 1000 parts of water and 250 parts of caustic soda solution of 36° Bé. The temperature is raised to 125–130° C. and condensation continued for 6 hours at this temperature. After cooling, the caustic soda solution is neutralized by acid and the separation of the dyestuff is completed by salting out; the dyestuff is then filtered.

The dried product is a reddish-brown powder which dissolves in water and dilute alkalies to yellow-orange solutions and in concentrated sulfuric acid to a blue solution; it dyes cotton yellow-orange tints very fast to light and alkalies.

If the temperature of condensation is increased to 150° C. there is obtained a product which dissolves in concentrated sulfuric acid to a blue solution and dyes cotton fast red-orange tints.

Non-sulfonated azo-dyestuffs containing amino-groups, such as aminoazobenzene, aminoazotoluene, aniline-azo-α-naphthylamine, 4-chloro-4'-amino-5'-methoxyl-2'-methyl-azobenzene, are advantageously condensed in an autoclave with addition of alcohol.

*Example 3*

30 parts of the saponified dyestuff from diazotized metanilic acid and aniline-ω-methanesulfonic acid, 35 parts of the dyestuff from diazotized metanilic acid and 1-methyl-3-amino-4-methoxybenzene of the formula

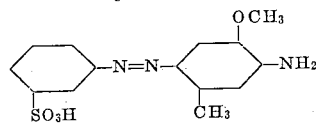

are condensed with 43 parts of dinitrostilbenedisulfonic acid in 1500 parts of water and 260 parts of caustic soda solution of 36° Bé. in an autoclave for 8 hours at 120–125° C. The dyestuff is salted out, filtered and dried.

It is a brown red powder, soluble in water and dilute alkalies to a red orange solution and in concentrated sulfuric acid to a blue solution and dyes cotton orange-red tints.

*Example 4*

An autoclave provided with a stirrer is charged with 723 parts of the saponified dyestuff from diazotized metanilic acid and the sodium salt of ortho-anisidine-ω-methanesulfonic acid, 430 parts of sodium dinitrostilbenedisulfonate, 10000 parts of water and 1000 parts of caustic soda solution of 36° Bé. The temperature is raised to 120–125° C. and the condensation which takes place is continued for 6 hours at this temperature. After cooling, the caustic soda solution is neutralized by acid, the partially separated dyestuff is wholly separated by salting out in the usual manner and filtered.

*Example 5*

An autoclave provided with a stirrer is charged with 672 parts of dehydrothiotoluidinemonosulfonic acid of the probable formula

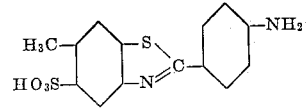

430 parts of sodium dinitrostilbenedisulfonate, 10000 parts of water and 1000 parts of caustic soda solution of 36° Bé. The temperature is raised to 125–130° C. and the condensation which takes place is continued for 6 hours at this temperature. After cooling, the partially separated dyestuff is wholly salted out and filtered, pressed and dried. The dried dyestuff is a red-brown powder soluble in water and dilute alkalies to a yellow-orange solution and in concentrated sulfuric acid to a pure violet solution. It dyes cotton yellow-orange tints fast to light and alkali.

*Example 6*

An autoclave provided with a stirrer is charged with 13 parts of acridine yellow (cf.

Schultz, Farbstofftabellen, 5th edition, No. 602), 8.6 parts of sodium dinitrostilbenedisulfonate, 200 parts of alcohol of 70 per cent. strength and 20 parts of caustic soda solution of 36° Bé. The temperature is raised to 120–130° C. and the condensation which takes place is continued for 6 hours at this temperature. After cooling, the free caustic soda is neutralized and the dyestuff salted out as usual. The dried product is a yellow-brown powder soluble in water and dilute alkalies to a yellow-orange solution and in concentrated sulfuric acid to a greenish-blue solution. It dyes cotton orange-brown tints If the acridon of the formula

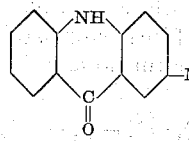

is substituted for the acridine, there is obtained a brown dyestuff soluble in water and dilute alkalies to an orange-brown solution and in concentrated sulfuric acid to a navy-blue solution. It dyes cotton fast orange-brown tints. With amino carbazol a product is obtained that dyes cotton also orange-brown shades.

*Example 7*

An autoclave provided with a stirrer is charged with 8.5 parts of 1-amino-4-para-phenylenediamine-anthraquinone-2-sulfonic acid of the formula

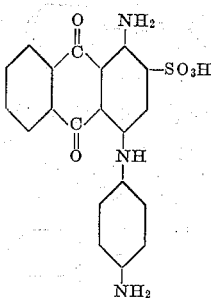

4.3 parts of sodium dinitrostilbenedisulfonate, 100 parts of water and 10 parts of caustic soda solution of 36° Bé. The condensation takes place and is continued for 6 hours at 125–135° C. The dyestuff is then separated as usual; when dried, it forms a black powder soluble in water and dilute alkalies to a brown solution and in concentrated sulfuric acid to a navy-blue solution. It dyes cotton greyish-brown tints.

*Example 8*

40 parts of the dyestuff from diazotized 4-chloro-2-amino-1-phenol and 2-amino-5-hydroxynaphthalene-7-sulfonic acid are condensed with 43 parts of dinitrodibenzyldisulfonic acid in 1000 parts of water and 200 parts of caustic soda solution of 36° Bé., the temperature being 120–125° C. and condensation being continued for 6 hours.

The dried product is a dark powder, which dissolves in dilute alkalies to a brown solution and in concentrated sulfuric acid to a violet solution and dies cotton red brown tints which become a fast grey when subsequently coppered.

A product of similar properties is obtained by condensing the copper compound of the azo-dyestuff from diazotized 4-chloro-2-amino-1-phenol-6-sulfonic acid and 2-amino-5-hydroxynaphthalene-7-sulfonic acid with dinitrostilbenedisulfonic acid. Instead of a copper compound a metalliferous dyestuff derived from another metal may be used.

*Example 9*

In an autoclave with a stirrer are mixed 28 parts of the azo-dyestuff from diazotized mono-acetyl-para-phenylene-diamine and salicylic acid, 43 parts of dinitrostilbenedisulfonic acid and 200 parts of caustic soda solution of 36° Bé.; the temperature is raised to 115–120° C. and condensation continued for 4 hours at this temperature.

The dyestuff is completely salted out and after neutralization of the alkali is filtered and dried.

It is a dark powder soluble in water to a brown-orange solution, in dilute sodium carbonate solution to a red-brown solution, in dilute caustic soda solution to a brownish-red solution and in concentrated sulfuric acid to a blue solution; it dyes cotton orange tints which become red-brown when coppered.

If the condensation is conducted with 50 parts of the azo-dyestuff from diazotized mono-acetyl-para-phenylene-diamine and salicylic acid and with 43 parts of dinitrostilbenedisulfonic acid, there is obtained a product which dissolves in concentrated sulfuric acid to a greenish-blue solution and dyes cotton tints which become fast red-brown when coppered.

What I claim is:—

1. Process for the manufacture of dyestuffs of the stilbene series, consisting in condensing conversion products of para-nitrotoluene-sulfonic acid of the general formula

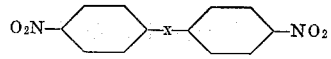

wherein each benzene nucleus contains at least one sulfo group, and $x$ stands for a bridge consisting of two carbon atoms each of which is linked with one of the benzene nuclei, in an alkaline medium in a closed system at 115 to 150° C. and in various stoichiometrical proportions, with aromatic amino-compounds of the benzene and naphthalene series.

2. Process for the manufacture of dyestuffs of the stilbene series, consisting in condensing conversion products of para-nitrotoluene-sulfonic acid of the general formula

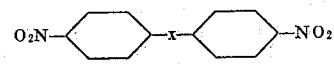

wherein each benzene nucleus contains at least one sulfo group, and $x$ stands for a bridge consisting of two carbon atoms each of which is linked with one of the benzene nuclei in an alkaline medium in a closed system at 115 to 150° C. and in various stoichiometrical proportions, with aromatic amino-compounds of the benzene and naphthalene series containing chromophoric groups.

3. Process for the manufacture of dyestuffs of the stilbene series, consisting in condensing dinitrostilbenedisulfonic acid of the formula

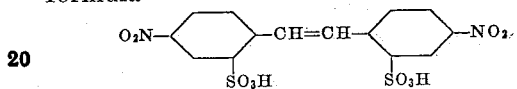

in an alkaline medium in a closed system at 115 to 150° C. and in various stoichiometrical proportions, with aromatic and amino-compounds of the benzene and naphthalene series containing chromophoric groups.

4. Process for the manufacture of dyestuffs, of the stilbene series, consisting in condensing dinitrostilbenedisulfonic acid of the formula

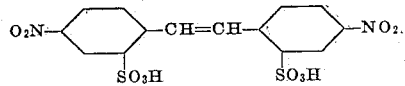

in an alkaline medium in a closed system at 115 to 150° C. and in various stoichiometrical proportions, with any amino-azo-dyestuff of the benzene and naphthalene series.

5. Process for the manufacture of dyestuffs of the stilbene series, consisting in condensing dinitrostilbenedisulfonic acid of the formula

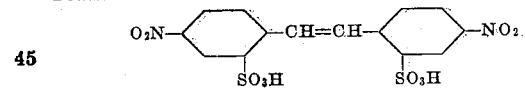

in an alkaline medium in a closed system at 115 to 150° C. and in various stoichiometrical proportions, with amino-azo-dyestuffs of the general formula $$R_1-N=N-R_2-NH_2$$

wherein $R_1$ and $R_2$ stand for aromatic nuclei of the benzene and naphthalene series.

6. Process for the manufacture of dyestuffs of the stilbene series, consisting in condensing dinitrostilbenedisulfonic acid of the formula

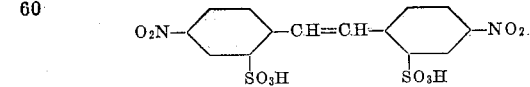

in an alkaline medium in a closed system at 115 to 150° C. and in various stoichiometrical proportions, with amino-azo-dyestuffs of the general formula $$R_1-N=N-R_2-NH_2$$

wherein $R_1$ and $R_2$ stand for aromatic nuclei of the benzene and naphthalene series of which at the most one is a nucleus of the naphthalene series.

7. Process for the manufacture of dyestuffs of the stilbene series, consisting in condensing dinitrostilbenedisulfonic acid of the formula

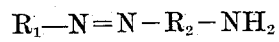

in an alkaline medium in a closed system at 115 to 150° C. and in various stoichiometrical proportions, with amino-azo-dyestuffs of the general formula $$R_1-N=N-R_2-NH_2$$

wherein $R_1$ and $R_2$ stand for nuclei of the benzene series.

8. Process for the manufacture of dyestuffs of the stilbene series, consisting in condensing dinitrostilbenedisulfonic acid of the formula

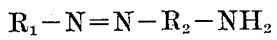

in an alkaline medium in a closed system at 115 to 150° C. and in various stoichiometrical proportions, with the azo-dyestuff of the formula

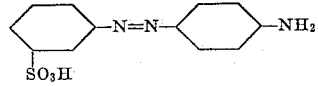

9. As new products the dyestuffs of the stilbene series which are formed by condensing the conversion products of para-nitrotoluenesulfonic acid of the general formula

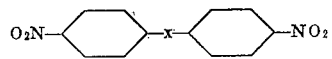

wherein each benzene nucleus contains at least one sulfo group, and $x$ stands for a bridge consisting of two carbon atoms each of which is linked with one of the benzene nuclei, in an alkaline medium in a closed system at 115 to 150° C. and in various stoichiometrical proportions, with aromatic amino-compounds of the benzene and naphthalene series, which products form dark powders, dissolving in water and dilute alkalies to brown, red-brown, red-orange and yellow-orange solutions, and in concentrated sulfuric acid to blue, green, red-violet, green-blue and violent solutions, and dyeing cotton yellow, red-orange, orange, yellow-orange, orange-brown and red-brown tints.

10. As new products the dyestuffs of the stilbene series which are formed by condensing the conversion products of para-nitrotoluenesulfonic acid of the general formula

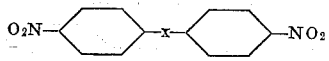

5 wherein each benzene nucleus contains at least one sulfo group, and $x$ stands for a bridge consisting of two carbon atoms each of which is linked with one of the benzene nuclei, in an alkaline medium in a closed system at 115 to 150° C. and in various stoichiometrical proportions, with aromatic amino-compounds of the benzene and naphthalene series containing chromophoric groups, which products form dark powders, dissolving in water and dilute alkalies to red-brown, red-orange and yellow-orange solutions, and in concentrated sulfuric acid to blue, green, green-blue solutions, and dyeing cotton red-orange, orange, yellow-orange, orange-brown and red-brown tints.

11. As new products the dyestuffs of the stilbene series which are formed by condensing dinitrostilbenedisulfonic acid of the formula

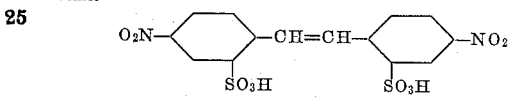

in an alkaline medium in a closed system at 115 to 150° C. and in various stoichiometrical proportions, with aromatic amino-compounds of the benzene and naphthalene series containing chromophoric groups, which products form dark powders, dissolving in water and dilute alkalies to red-brown, red-orange and yellow-orange solutions, and in concentrated sulfuric acid to blue, green and green-blue solutions, and dyeing cotton red-orange, orange, yellow-orange, orange-brown and red-brown tints.

12. As new products the dyestuffs of the stilbene series which are formed by condensing dinitrostilbenedisulfonic acid of the formula

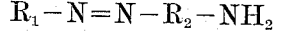

in an alkaline medium in a closed system at 115 to 150° C. and in various stoichiometrical proportions, with any amino-azo-dyestuff of the benzene and naphthalene series, which products form dark powders, dissolving in water and dilute alkalies to red-brown, red-orange and yellow-orange solutions, and in concentrated sulfuric acid to blue, green and green-blue solutions, and dyeing cotton red-orange, orange, yellow-orange, orange-brown and red-brown tints.

13. As new products the dyestuffs of the stilbene series which are formed by condensing dinitrostilbenedisulfonic acid of the formula

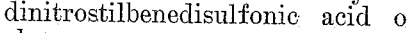

in an alkaline medium in a closed system at 115 to 150° C. and in various stoichiometrical proportions, with an amino-azo-dyestuff of the general formula $$R_1 - N = N - R_2 - NH_2$$

wherein $R_1$ and $R_2$ stand for aromatic nuclei of the benzene and naphthalene series, which products form dark powders, dissolving in water and dilute alkalies to red-brown, red-orange and yellow-orange solutions, and in concentrated sulfuric acid to blue, green and green-blue solutions, and dyeing cotton red-orange, orange, yellow-orange, orange-brown and red-brown tints.

14. As new products the dyestuffs of the stilbene series which are formed by condensing dinitrostilbenedisulfonic acid of the formula

in an alkaline medium in a closed system at 115 to 150° C. and in various stoichiometrical proportions, with an amino-azo-dyestuff of the general formula $$R_1 - N = N - R_2 - NH_2$$

wherein $R_1$ and $R_2$ stand for aromatic nuclei of the benzene and naphthalene series of which at the most one is a nucleus of the naphthalene series, which products form dark powders, dissolving in water and dilute alkalies to red-brown, red-orange and yellow-orange solutions, and in concentrated sulfuric acid to blue, green and green-blue solutions, and dyeing cotton red-orange, orange, yellow-orange, orange-brown and red-brown tints.

15. As new products the dyestuffs of the stilbene series which are formed by condensing dinitrostilbenedisulfonic acid of the formula

in an alkaline medium in a closed system at 115 to 150° C. and in various stoichiometrical proportions, with an amino-azo-dyestuff of the general formula $$R_1 - N = N - R_2 - NH_2$$

wherein $R_1$ and $R_2$ stand for nuclei of the benzene series, which products form dark powders, dissolving in water and dilute alkalies to red-brown, red-orange and yellow-orange solutions, and in concentrated sulfuric acid to blue, green and green-blue solutions, and dyeing cotton red-orange, orange, yellow-orange, orange-brown and red-brown tints.

16. As new products the dyestuffs of the stilbene series which are formed by condensing dinitrostilbenedisulfonic acid of the formula

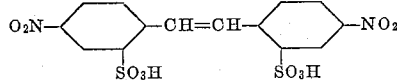

in an alkaline medium in a closed system at 115 to 150° C. and in various stoichiometrical proportions, with the azo-dyestuff of the formula

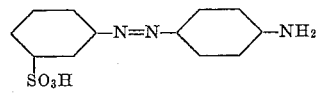

which products form dark powders, dissolving in water and dilute alkalies to red-orange solutions, and in concentrated sulfuric acid to blue solutions, and dyeing cotton orange tints which are fast to alkalies and very fast to light.

17. As a new product the dyestuff which is formed by condensing dinitrostilbenedisulfonic acid of the formula

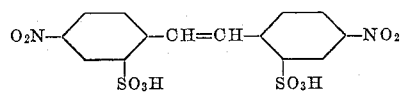

in an alkaline medium, in a closed system, and at about 130° C., with two molecular proportions of the azo-dyestuff of the formula

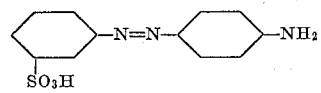

which product forms a dark powder, dissolving in water and dilute alkalies to a red-orange solution, and in concentrated sulfuric acid to a blue solution, and dyeing cotton orange tints which are fast to alkalies and very fast to light.

18. As a new product the dyestuff which is formed by condensing dinitrostilbenedisulfonic acid of the formula

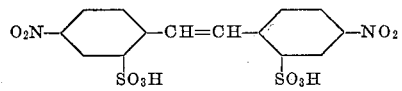

in an alkaline medium, in a closed system, and at about 130° C., with two molecular proportions of the azo-dyestuff of the formula

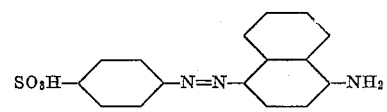

which product forms a dark powder, dissolving in water and dilute alkalies to a red solution, and in concentrated sulfuric acid to a navy-blue solution, and dyeing cotton red tints which are fast to light.

19. As a new product the dyestuff which is formed by condensing dinitrostilbenedisulfonic acid of the formula

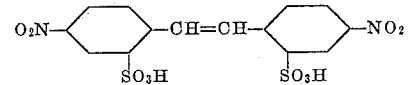

in an alkaline medium, in a closed system, and at 130 to 140° C., with two molecular proportions of the dehydro-thiotoluidine-sulfonic acid of the probable formula

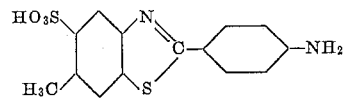

which product forms a dark yellow powder, dissolving in water and dilute alkalies to a yellow solution, and in concentrated sulfuric acid to a violet-red solution, and dyeing cotton strong yellow tints which are fast to light and alkalies.

In witness whereof I have hereunto signed my name this 1st day of March, 1930.

MAX SCHMID.